(12) United States Patent
Venkatesan et al.

(10) Patent No.: US 6,790,551 B2
(45) Date of Patent: Sep. 14, 2004

(54) MODIFIED REDOX COUPLE FUEL CELL CATHODES AND FUEL CELLS EMPLOYING SAME

(75) Inventors: Srinivasan Venkatesan, Southfield, MI (US); Boyko Aladjov, Rochester Hills, MI (US); Subhash K. Dhar, Bloomfield, MI (US); Stanford R. Ovshinsky, Bloomfield Hills, MI (US)

(73) Assignee: Texaco Ovonic Fuel Cell UC, Rochester Hills, MI (US)

( * ) Notice: Subject to any disclaimer, the term of this patent is extended or adjusted under 35 U.S.C. 154(b) by 192 days.

(21) Appl. No.: 10/238,275

(22) Filed: Sep. 10, 2002

(65) Prior Publication Data

US 2003/0027034 A1 Feb. 6, 2003

Related U.S. Application Data

(63) Continuation-in-part of application No. 09/797,332, filed on Mar. 1, 2001, now Pat. No. 6,620,539.

(51) Int. Cl.$^7$ .............................................. H01M 4/00
(52) U.S. Cl. ............................. 429/27; 429/40; 429/42; 429/44; 429/17; 429/218.2
(58) Field of Search ................................. 429/27, 40, 42, 429/44, 17, 218.2

(56) References Cited

U.S. PATENT DOCUMENTS 3,791,896 A * 2/1974 Sklarchuk ................... 429/42

* cited by examiner

*Primary Examiner*—Patrick Ryan
*Assistant Examiner*—Angela J. Martin
(74) *Attorney, Agent, or Firm*—Frederick W. Mau, II; David W. Schumaker; Marvin S. Siskind

(57) ABSTRACT

Fuel cell oxygen electrodes and instant startup fuel cells employing the oxygen electrode. The oxygen electrodes operate through the mechanism of redox couples which uniquely provide multiple degrees of freedom in selecting the operating voltages available for such fuel cells. Such oxygen electrodes provide the fuel cells in which they are used a "buffer" or "charge" of oxidizer available within the oxygen electrode at all times. The redox couple materials are modified to inhibit dissolution of the materials into the alkaline electrolyte of the fuel cell, and to match the gas phase kinetics of the active redox couple material with its electrochemical kinetics.

44 Claims, 6 Drawing Sheets

MODIFIED REDOX COUPLE FUEL CELL CATHODES AND FUEL CELLS EMPLOYING SAME

RELATED APPLICATIONS

The present invention is a continuation-in-part of, and is entitled to the benefit of the earlier filing date and priority of, U.S. patent application Ser. No. 09/797,332, which is assigned to the same assignee as the current application, entitled "NOVEL FUEL CELL CATHODES AND THEIR FUEL CELLS", filed Mar. 1, 2001, now U.S. Pat. No. 6,620,539, the disclosure of which is hereby incorporated by reference.

FIELD OF THE INVENTION

The instant invention relates to generally to useful oxygen electrode active materials for fuel cells, more specifically to their use as the oxygen electrode material for Ovonic instant startup alkaline fuel cells. These inventive oxygen electrodes open up a tremendous number of degrees of freedom in fuel cell design by utilizing reduction/oxidation (redox) couples, such as metal/oxide couples, or simply couples which provide electrochemical oxidizer, preferably oxygen, to the fuel cell electrolyte for electrochemical "combustion". These redox couples, due to their electrochemical potential, provide the fuel cells employing them with an increased operating voltage that is adjustable by varying the redox couple used. Additionally the redox couple provides the fuel cell with the ability to store oxygen within the electrode which not only provides for instant startup, but also provides the capability to provide short surge bursts of energy during demand surges and also allows for recapture of regenerative energy. The present enhanced fuel cell oxygen electrode materials display an increased resistance to dissolution in the fuel cell electrolyte and an increased catalytic activity toward the dissociation of molecular oxygen into atomic oxygen.

BACKGROUND OF THE INVENTION

As the world's human population expands, greater amounts of energy are necessary to provide the economic growth all nations desire. The traditional sources of energy are the fossil fuels which, when consumed, create significant amounts of carbon dioxide as well as other more immediately toxic materials including carbon monoxide, sulfur oxides, and nitrogen oxides. Increasing atmospheric concentrations of carbon dioxide are warming the earth; creating the ugly specter of global climatic changes. Energy-producing devices which do not contribute to such difficulties are needed now.

A fuel cell is an energy-conversion device that directly converts the energy of a supplied gas into an electric energy. Highly efficient fuel cells employing hydrogen, particularly with their simple combustion product of water, would seem an ideal alternative to current typical power generations means. Researchers have been actively studying such devices to utilize the fuel cell's potential high energy-generation efficiency.

The base unit of the fuel cell is a cell having an oxygen electrode, a hydrogen electrode, and an appropriate electrolyte. Fuel cells have many potential applications such as supplying power for transportation vehicles, replacing steam turbines and power supply applications of all sorts. Despite their seeming simplicity, many problems have prevented the widespread usage of fuel cells.

Presently most of the fuel cell R & D is focused on P.E.M. (Proton Exchange Membrane) fuel cells. Regrettably, the P.E.M. fuel cell suffers from relatively low conversion efficiency and has many other disadvantages. For instance, the electrolyte for the system is acidic. Thus, noble metal catalysts are the only useful active materials for the electrodes of the system. Unfortunately, not only are the noble metals costly, they are also susceptible to poisoning by many gases, specifically carbon monoxide (CO). Also, because of the acidic nature of the P.E.M fuel cell electrolyte, the remainder of the materials of construction of the fuel cell need to be compatible with such an environment, which again adds to the cost and choice of materials thereof. The proton exchange membrane itself is quite expensive, and because of it's low proton conductivity at temperatures below 80° C., inherently limits the power performance and operational temperature range of the P.E.M. fuel cell as the PEM is nearly non-functional at low temperatures. Also, the membrane is sensitive to high temperatures, and begins to soften at 120° C. The membrane's conductivity depends on water and has a tendency to dry out at higher temperatures, thus causing cell failure. Therefore, there are many disadvantages to the P.E.M. fuel cell which make it somewhat undesirable for commercial/consumer use.

The conventional alkaline fuel cells have some advantages over P.E.M. fuel cells in that they have higher operating efficiencies, they use less costly materials of construction, and they have no need for expensive membranes. The alkaline fuel cell also enjoys the relatively higher ionic conductivity of the electrolyte, and therefore has a much higher power capability. The kinetics within the alkaline are also much faster as compared to a P.E.M. fuel cell. While the conventional alkaline fuel cell is less sensitive to temperature than the PEM fuel cell, the platinum active materials of conventional alkaline fuel cell electrodes become very inefficient at low temperatures. Unfortunately, conventional alkaline fuel cells still suffer from their own disadvantages.

For example, conventional alkaline fuel cells still use expensive noble metal catalysts in both electrodes, which, as in the P.E.M. fuel cell, are susceptible to gaseous contaminant poisoning. The conventional alkaline fuel cell is also susceptible to the formation of carbonates from $CO_2$ produced by oxidation of the anode carbon substrates or introduced via impurities in the fuel and air used at the electrodes. This carbonate formation clogs the electrolyte/electrode surface and reduces/eliminates the activity thereof. In addition it can also reduce the conductivity of the electrolyte. The invention described herein eliminates this problem from the anode.

Fuel cells, like batteries, operate by utilizing electrochemical reactions. Unlike a battery, in which chemical energy is stored within the cell, fuel cells generally are supplied with reactants from outside the cell. Barring failure of the electrodes, as long as the fuel, preferably hydrogen, and oxidant, typically air or oxygen, are supplied and the reaction products are removed, the cell continues to operate.

Fuel cells offer a number of important advantages over internal combustion engine or generator systems. These include relatively high efficiency, environmentally clean operation especially when utilizing hydrogen as a fuel, high reliability, few moving parts, and quiet operation. Fuel cells potentially are more efficient than other conventional power sources based upon the Carnot cycle.

The major components of a typical fuel cell are the hydrogen electrode for hydrogen oxidation and the oxygen electrode for oxygen reduction, both being positioned in a cell containing an electrolyte (such as an alkaline electrolytic solution). Typically, the reactants, such as hydrogen and oxygen, are respectively fed through a porous anode and oxygen electrode and brought into surface contact with the electrolytic solution. The particular materials utilized for the oxygen electrode and anode are important since they must act as efficient catalysts for the reactions taking place.

In an alkaline fuel cell, the reaction at the anode occurs between the hydrogen fuel and hydroxyl ions (OH⁻) present in the electrolyte, which react to form water and release electrons:

$$H_2 + 2OH^- \rightarrow 2H_2O + 2e^- \quad E_0 = -0.828 \, v.$$

At the oxygen electrode, the oxygen, water, and electrons react in the presence of the oxygen electrode catalyst to reduce the oxygen and form hydroxyl ions (OH⁻):

$$O_2 + 2H_2O + 4e^- \rightarrow 4OH^- \quad E_0 = -0.401 \, v.$$

The total reaction, therefore, is:

$$2H_2 = O_2 \rightarrow 2H_2O \quad E_0 = -1.229 \, v$$

The flow of electrons is utilized to provide electrical energy for a load externally connected to the anode and oxygen electrode.

It should be noted that the anode catalyst of the alkaline fuel cell is required to do more than catalyze the reaction of H⁺ ions with OH⁻ ions to produce water. Initially the anode must catalyze and accelerate the formation of H⁺ ions and release e⁻ from H₂. This occurs via formation of atomic hydrogen from molecular hydrogen. The overall reaction may be simplified and presented (where M is the catalyst) as:

$$M + H_2 \rightarrow 2M \ldots H^- M + 2H^+ + 2e^-.$$

Thus the anode catalyst must not only efficiently catalyze the electrochemical reaction for the formation of water at the electrolyte interface but must also efficiently dissociate molecular hydrogen into atomic hydrogen. Using conventional anode material, the dissociated hydrogen is transitional and the hydrogen atoms can easily recombine to form molecular hydrogen if they are not used very efficiently in the oxidation reaction. With the hydrogen storage anode materials of the inventive instant startup fuel cells, hydrogen is stored in hydride form as soon as they are created, and then are used as needed to provide power.

In addition to being catalytically efficient on both interfaces, the catalytic material must be resistant to corrosion by the alkaline electrolyte. Without such corrosion resistance, the electrode would quickly succumb to the harsh environment and the cell would quickly lose efficiency and die.

One prior art fuel cell anode catalyst is platinum. Platinum, despite its good catalytic properties, is not very suitable for wide scale commercial use as a catalyst for fuel cell anodes, because of its very high cost, and the limited world supply. Also, noble metal catalysts like platinum, also cannot withstand contamination by impurities normally contained in the hydrogen fuel stream. These impurities can include carbon monoxide which may be present in hydrogen fuel or contaminants contained in the electrolyte such as the impurities normally contained in untreated water including calcium, magnesium, iron, and copper.

The above contaminants can cause what is commonly referred to as a "poisoning" effect. Poisoning occurs where the catalytically active sites of the material become inactivated by poisonous species that effectively block the active sites from being active. Once the catalytically active sites are inactivated, they are no longer available for acting as catalysts for efficient hydrogen oxidation reaction at the anode. The catalytic efficiency of the anode therefore is reduced since the overall number of available catalytically active sites is significantly lowered by poisoning. In addition, the decrease in catalytic activity results in increased overvoltage at the anode and hence the cell is much less efficient adding significantly to the operating costs. Overvoltage is the difference between the actual working electrode potential under some conditions and it's equilibrium value, the physical meaning of overvoltage is the voltage required to overcome the resistance to the passage of current at the surface of the anode (charge transfer resistance). The overvoltage represents an undesirable energy loss which lowers the operating efficiency and adds to the operating costs of the fuel cell.

In related work, U.S. Pat. No. 4,623,597 ("the '597 patent") and others in it's lineage, the disclosure of which is hereby incorporated by reference, one of the present inventors, Stanford R. Ovshinsky, described disordered multi-component multi-phase hydrogen storage materials for use as negative electrodes in electrochemical cells for the first time. In this patent, Ovshinsky describes how disordered materials can be tailor made (i.e., atomically engineered) to greatly increase hydrogen storage and reversibility characteristics. Such disordered materials are amorphous, microcrystalline, intermediate range order, and/or polycrystalline (lacking long range compositional order) wherein the polycrystalline material includes topological, compositional, translational, and positional modification and disorder. The framework of active materials of these disordered materials consist of a host matrix of one or more elements and modifiers incorporated into this host matrix. The modifiers enhance the disorder of the resulting materials and thus create a greater number and spectrum of catalytically active sites and hydrogen storage sites.

The disordered electrode materials of the '597 patent were formed from lightweight, low cost elements by any number of techniques, which assured formation of primarily non-equilibrium metastable phases resulting in the high energy and power densities and low cost. The resulting low cost, high energy density disordered material allowed the batteries to be utilized most advantageously as secondary batteries, but also as primary batteries.

Tailoring of the local structural and chemical order of the materials of the '597 patent was of great importance to achieve the desired characteristics. The improved characteristics of the anodes of the '597 patent were accomplished by manipulating the local chemical order and hence the local structural order by the incorporation of selected modifier elements into a host matrix to create a desired disordered material. Disorder permits degrees of freedom, both of type and of number, within a material, which are unavailable in conventional materials. These degrees of freedom dramatically change a materials physical, structural, chemical and electronic environment. The disordered material of the '597 patent have desired electronic configurations which result in a large number of active sites. The nature and number of storage sites were designed independently from the catalytically active sites.

Multiorbital modifiers, for example transition elements, provide a greatly increased number of storage sites due to various bonding configurations available, thus resulting in an increase in energy density. The technique of modification especially provides non-equilibrium materials having varying degrees of disorder provided unique bonding configurations, orbital overlap and hence a spectrum of bonding sites. Due to the different degrees of orbital overlap and the disordered structure, an insignificant amount of structural rearrangement occurs during charge/discharge cycles or rest periods there between resulting in long cycle and shelf life.

The improved battery of the '597 patent included electrode materials having tailor-made local chemical environments which were designed to yield high electrochemical charging and discharging efficiency and high electrical charge output. The manipulation of the local chemical environment of the materials was made possible by utilization of a host matrix which could, in accordance with the '597 patent, be chemically modified with other elements to create a greatly increased density of electro-catalytically active sites and hydrogen storage sites.

The disordered materials of the '597 patent were designed to have unusual electronic configurations, which resulted from the varying 3-dimensional interactions of constituent atoms and their various orbitals. The disorder came from compositional, positional and translational relationships of atoms. Selected elements were utilized to further modify the disorder by their interaction with these orbitals so as to create the desired local chemical environments.

The internal topology that was generated by these configurations also allowed for selective diffusion of atoms and ions. The invention that was described in the '597 patent made these materials ideal for the specified use since one could independently control the type and number of catalytically active and storage sites. All of the aforementioned properties made not only an important quantitative difference, but qualitatively changed the materials so that unique new materials ensued.

Disorder can be of an atomic nature in the form of compositional or configurational disorder provided throughout the bulk of the material or in numerous regions of the material. The disorder also can be introduced by creating microscopic phases within the material which mimic the compositional or configurational disorder at the atomic level by virtue of the relationship of one phase to another. For example, disordered materials can be created by introducing microscopic regions of a different kind or kinds of crystalline phases, or by introducing regions of an amorphous phase or phases, in addition to regions of a crystalline phase or phases. The interfaces between these various phases can provide surfaces which are rich in local chemical environments which provide numerous desirable sites for electrochemical hydrogen storage.

These same principles can be applied within a single structural phase. For example, compositional disorder is introduced into the material which can radically alter the material in a planned manner to achieve important improved and unique results, using the Ovshinsky principles of disorder on an atomic or microscopic scale.

Additionally, in copending U.S. application Ser. No. 09/524,116, ('116), the disclosure of which is hereby incorporated by reference, Ovshinsky has employed the principles of atomic engineering to tailor materials which uniquely and dramatically advance the fuel cell art. The invention of '116 application has met a need for materials which allow fuel cells to startup instantaneously by providing an internal source of fuel, to operate in a wide range of ambient temperatures to which a fuel cell will be exposed to under ordinary consumer use and to allow the fuel cell to be run in reverse as an electrolyzer thereby utilizing/storing recaptured energy. The anodes of the '116 fuel cells are formed from relatively inexpensive hydrogen storage materials which are highly catalytic to the dissociation of molecular hydrogen and the formation of water from hydrogen and hydroxyl ions as well as being corrosion resistant to the electrolyte, resistant to contaminant poisoning from the reactant stream and capable of working in a wide temperature range.

The next step in the evolution of the fuel cell was to find suitable materials to replace the expensive platinum oxygen electrode catalysts of conventional fuel cells. This occurred with the invention of copending U.S. patent application Ser. No. 09/797,332 filed Mar. 1, 2001 entitled "NOVEL FUEL CELL CATHODES AND THEIR FUEL CELLS", the disclosure of which is hereby incorporated by reference. These oxygen electrodes have the ability to store chemical energy (in the form of chemically bound oxygen) to assist in the instant startup of the fuel cell as well as recapture energy The invention described the copending application was significant in that it provided the next step in the development of fuel cells. With that invention, the oxygen electrode could be selected from a broad menu of available possible redox couples. These redox couples in addition to providing a store of chemical energy, allow the operating voltage of the fuel cell to be selected, by judicious choice of the redox couple used.

While these improved oxygen electrodes are very useful, they have some problems that up to now have not been addressed. Namely, the redox couple material can sometimes be somewhat soluble in the fuel cell electrolyte solution. Additionally, the redox couple may need it's catalytic activities matched. That is, the redox couple materials may have a faster rate of electrochemical activity than their gas phase activity, or vice versa. Thus there is a need in the art to increase the stability of the active redox couple material toward dissolution in the electrolyte and to match the gas phase kinetics of the active redox couple material with its electrochemical kinetics.

SUMMARY OF THE INVENTION

The present invention discloses a fuel cell which has the ability to start up instantly and can accept recaptured energy such as that of regenerative braking by operating in reverse as an electrolyzer. The instant startup fuel cells have increased efficiency and power availability (higher voltage and current) and a dramatic improvement in operating temperature range (−20 to 150° C.) The fuel cells of the instant invention also have additional degrees of freedom over the fuel cells of the prior art in that the voltage output of the cell can be tailored and they are capable of storing regenerated energy.

The oxygen electrodes of the instant fuel cells operate through the mechanism of redox reactions which uniquely provide multiple degrees of freedom in selecting the operating voltages available for such fuel cells. Such oxygen electrodes provide the fuel cells in which they are used, particularly alkaline fuel cells, with a level of chemical energy storage within the oxygen electrode itself. This means that such fuel cells will have a "buffer" or "charge" available within the oxygen electrode at all times.

The fuel cell oxygen electrodes of the instant invention employ modified active redox couple materials which exhibit increased stability of the active redox couple material toward dissolution in the electrolyte and which match the gas phase kinetics of the active redox couple material with its electrochemical kinetics. Specific modifiers which may be added to the redox couples includes elements such as Li, B, Si, Al, Ni, Cr, Mn, Mo, Misch Metal, Sn, Hg, Pb, Ga, and alloys thereof.

The electrode has a first surface region situated to allow exposure to molecular oxygen which includes a catalytically acting component promoting the absorption of oxygen through said first surface region and into said active material to chemically charge said active material through oxygen absorption.

The fuel cell oxygen electrodes of this invention may utilize redox couples, particularly metal/oxides couples selected from the group of metals consisting of copper, silver, zinc, cobalt and cadmium. Another useful redox couple is the nickel hydroxide/nickel oxyhydroxide couple disclosed herein above.

DETAILED DESCRIPTION OF THE INVENTION

Figure 1:
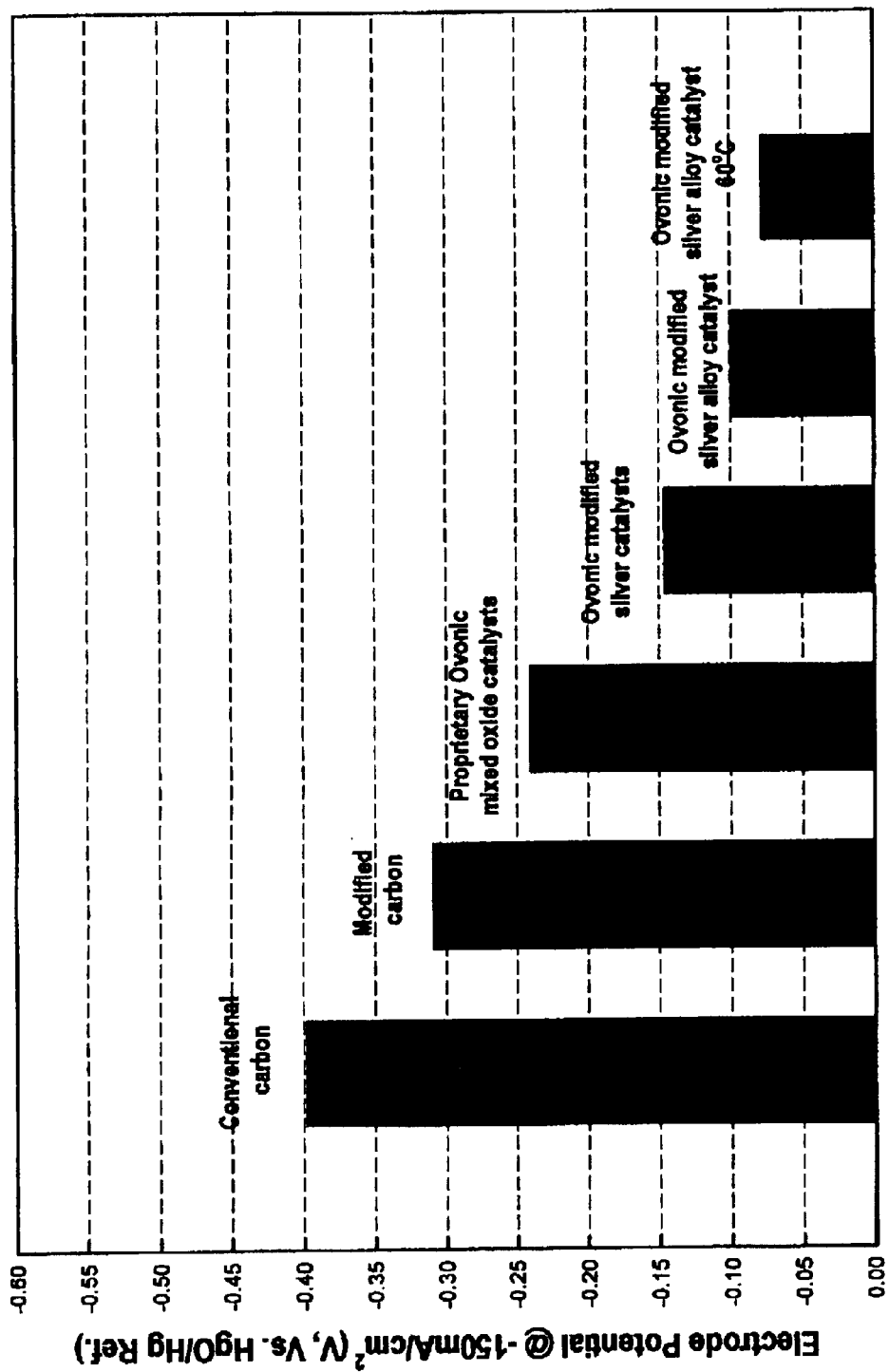
FIG. 1, is a bar chart showing the performance of many different oxygen electrodes at room temperature as compared to the oxygen electrode in accordance with the present invention.

This invention relates to oxygen electrodes for fuel cells, which operate through the mechanism of redox reactions. The invention more particularly relates to redox couple materials which have been modified to inhibit the dissolution of such redox couple materials in the electrolyte solution when used in a fuel cell and provide matched catalytic kinetics. The term "matched catalytic kinetics" means that the gas phase and the electrochemical kinetics of the redox couple material is matched such that the kinetics of the gas phase catalytic oxidation of the redox couple material is identical to the kinetics of the liquid phase electrocatalytic reduction of the redox couple material. Specific examples of what "matched catalytic kinetics" entails and specific modifiers for redox couple materials are described in detail herein below.

Oxygen electrodes employing redox couples provide multiple degrees of freedom in selecting the operating voltages available for fuel cells with many variable and reversible redox couples available as choices. Such oxygen electrodes, or oxidizable electrodes, provide the fuel cells in which they are used, particularly alkaline fuel cells, with a level of electrochemical energy storage within the oxygen electrode itself. This means that such fuel cells will have a "buffer" or "charge" of reactant available within the oxygen electrode at all times which, particularly combined with hydrogen storage anodes described in copending U.S. application Ser. No. 09/524,116 (the disclosure of which is hereby incorporated by reference), yield instant start fuel cells in general and more specifically to Ovonic instant start alkaline fuel cells. Such fuel cells have a built in reserve of hydrogen within the hydrogen electrode and oxygen electrode reactant (possibly oxygen) in the oxygen electrode for instant startup (discussed herein below), and have the ability to accept the energy of regenerative braking by acting as an electrolyzer (also discussed herein below). The fuel cell has increased efficiency and increased power capabilities as compared with conventional fuel cells of the prior art, while dramatically increasing the operating temperature range of the cell (–20 to 150° C.) The fuel cell is easy to assemble and has the advantage of utilizing proven, low cost production techniques.

The present invention also relates to fuel cell hydrogen electrodes and oxygen electrodes, and an energy supply system incorporating the present fuel cell. The fuel cell hydrogen electrode includes materials, which have inherent catalytic activity as well as hydrogen storage capacity. The oxygen electrode and hydrogen electrode materials do not include any noble metals, and are therefore inherently low cost. The oxygen electrode and hydrogen electrode materials are robust and long-lived, being resistant to poisoning. The hydrogen electrode does not utilize the carbon substrates of the prior art. While a detailed discussion of the instant electrodes and their utilization in an alkaline fuel cell is described herein below, it should be noted that the concepts of the instant invention can be applied to other types of fuel cells (e.g. P.E.M. fuel cells).

In general, for such fuel cell oxygen electrodes, oxygen is generally available to the oxygen electrode on a continuously-supplied basis on one side thereof where the catalytically active material converts the molecular oxygen into atomic oxygen which then migrates through the electrode and is reduced at the electrode/electrolyte interface to form hydroxyl ions. In prior art oxygen electrodes, no storage of reactant occurs. That is oxygen travels directly through the active materials and reacts at the electrode/electrolyte interface. In the oxygen electrodes of the instant invention, oxygen is stored in the oxygen electrode within the reversible redox couples, and is then available, at the electrode/electrolyte interface surface of the oxygen electrode. Available electrons will then be generated through the electrochemical reaction with the fuel. Thus the fuel cell will provide a constant supply of electricity at voltages characteristic of the redox couple, or electrochemically reversible redox system (e.g. a metal and its oxide). Additionally, this added benefit may be obtained by redox couples other than between the simple combination of a metal and its oxidized form. An example of this is the redox couple of nickel hydroxide/nickel oxyhydroxide. With such a redox system, the fuel cell will provide a potential whose theoretical voltage limit is the sum of the hydrogen electrode and oxygen electrode reactions. Certainly the theoretical limit of voltage available is modified or limited by other considerations, particularly including internal resistance of the electrodes and the complete fuel cell system.

The instant invention specifically relates to a fuel cell oxygen electrode comprising an oxygen electrode active material having matched catalytic kinetics capable of reversibly storing energy through the mechanism of a redox couple. The oxygen electrode active material having a first surface region situated to allow exposure to molecular oxygen wherein the first surface region includes a catalytically acting component promoting the absorption of molecular oxygen through the first surface region and conversion thereof into atomic oxygen. The oxygen electrode active material also includes a redox couple material (e.g. a metal) which is thereafter chemically charged by reaction with the atomic oxygen. The fuel cell oxygen electrode also includes a second surface region situated to allow exposure to the fuel cell electrolyte. The second surface region includes a catalytically acting component promoting the reactions between the redox active material and the electrolyte. The oxygen electrode may also include a hydrophobic component positioned between the first and second surface regions. Such a fuel cell oxygen electrode will display favorable voltage potential over conventional prior art oxygen electrodes.

The fuel cell oxygen electrodes of this invention may utilize metal/oxides couples selected from the group of metals consisting of copper, silver, zinc, cobalt, cadmium, and combinations thereof. Another useful redox couple is the nickel hydroxide/nickel oxyhydroxide disclosed herein above. Specific additives which may be added to the redox couples to inhibit the dissolution of the active material in the electrolyte and to help provide matched catalytic kinetics include elements such as Li, B, Si, Al, Ni, Cr, Mn, Mo, Misch Metal, Sn, Hg, Pb, Ga, and alloys thereof.

The fuel cell oxygen electrodes of the instant invention may also include other catalytic materials, which promote and speed the dissociation of molecular oxygen into atomic oxygen (which reacts with the redox couple). A particularly useful catalyst is carbon. As discussed herein below this carbon should be very porous and may be electrically conductive.

The oxygen electrodes also need a barrier means to isolate the electrolyte, or wet, side of the oxygen electrode from the gaseous, or dry, side of the oxygen electrode. A beneficial means of accomplishing this is by inclusion of a hydrophobic component comprising a halogenated organic compound, particularly polytetrafluoroethylene (PTFE) within the electrode.

The oxygen electrodes, may also include a current collector grid or current collecting system extending within said active material. The current collector may comprise an electrically conductive mesh, grid, foam, expanded metal, or combination thereof. The most preferable current collector grid is a conductive mesh having 40 wires per inch horizontally and 20 wires per inch vertically. The wires comprising the mesh may have a diameter between 0.005 inches and 0.01 inches, preferably between 0.005 inches and 0.008 inches. This design provides optimal current distribution due to the reduction of the ohmic resistance. Where more than 20 wires per inch are vertically positioned, problems may be encountered when affixing the active material to the substrate.

Numerous redox couples exist and may be used to form the oxygen electrode of this invention. When such couples are used, cycling transition from the oxidized form to the reduced form is accomplished instantaneously, repeatedly, and continuously. From a practical point of view, the ability to withstand such cycling is preferred. While not wishing to be bound by theory, the inventors believe that the equations representing some of the many available reactions for the oxygen side of the fuel cell are presented below. Using a nickel hydroxide/oxyhydroxide redox couple:

$$OH^- + Ni(OH)_2 \rightarrow NiOOH + H_2O$$

$$C + O_2 \rightarrow C \ldots O \text{ (Intermediate step for adsorbed oxygen)}$$

$$C \ldots O + Ni(OH)_2 \rightarrow NiOOH + H_2O + C,$$

or during regenerative braking or other charging input:

$$Ni(OH)_2 + e^- + H_2O \rightarrow 2NiOOH + OH^-$$

$$H_2 + 2OH^- \rightarrow 2H_2O + 2e^-.$$

Using a copper/copper oxide couple, the following is believed to be the useful fuel cell oxygen-side reactions:
Step 1: Water discharge on carbon substrate creating adsorbed hydrogen.

$$C + H_2O + e^- \rightarrow C \ldots H \text{ (adsorbed hydrogen)} + OH^-$$

Step 2: Reduction of copper oxide by adsorbed hydrogen to form water and copper.

$$2C \ldots H + CuO \rightarrow C + Cu + H_2O.$$

Step 3: Chemical oxidation of copper metal with the incoming air to form copper oxide thus completing the cycle.

$$2Cu + O_2 \rightarrow 2CuO$$

Using a silver/silver oxide couple, the following is believed to be the useful fuel cell oxygen-side reactions:
Step 1: Water discharge on carbon substrate creating adsorbed hydrogen.

$$C + H_2O + e^- \rightarrow C \ldots H \text{ (adsorbed hydrogen)} + OH^-$$

Step 2: Reduction of silver oxide by adsorbed hydrogen to form water and silver.

$$2C \ldots H + Ag_2O \rightarrow 2C + 2Ag + H_2O.$$

Step 3: Chemical oxidation of silver metal with the incoming air to form silver oxide thus completing the cycle.

$$4Ag + O_2 \rightarrow 2Ag_2O$$

Using a zinc/zinc oxide couple, the following is believed to be the useful fuel cell oxygen-side reactions:
Step 1: Water discharge on carbon substrate creating adsorbed hydrogen.

$$C + H_2O + e^- \rightarrow C \ldots H \text{ (adsorbed hydrogen)} + OH^-$$

Step 2: Reduction of zinc oxide by adsorbed hydrogen to form water and zinc.

$$2C \ldots H + ZnO \rightarrow C + Zn + H_2O.$$

Step 3: Chemical oxidation of the zinc metal with the incoming air to form zinc oxide thus completing the cycle.

$$2Zn + O_2 \rightarrow 2ZnO$$

Using a cadmium/cadmium oxide couple, the following is believed to describe the useful fuel cell oxygen-side reactions:
Step 1: Water discharge on carbon substrate creating adsorbed hydrogen.

$$C + H_2O + e^- \rightarrow C \ldots H \text{ (adsorbed hydrogen)} + OH^-$$

Step 2: Reduction of cadmium oxide by adsorbed hydrogen to form water and cadmium.

$$2C \ldots H + CdO \rightarrow C + Cd + H_2O.$$

Step 3: Chemical oxidation of cadmium metal with the incoming air to form cadmium oxide thus completing the cycle.

$$2Cd+O_2 \rightarrow 2CdO$$

As noted earlier, the previous sets of reactions provide a few exemplary redox couple reactions which will be useful for the air or oxygen side of fuel cells using the electrodes of this invention. These examples are provided simply to demonstrate useful couples; the list certainly is not exhaustive, nor is it intended to be so. Many other redox couples are available and will have useful application in the inventive oxygen-side electrodes which are, in turn, useful in the described inventive fuel cells.

Ideally, quantifying the useful benefits of a few of these couples and assuming a perfect match of both of the rates (oxidation/reduction) of reaction we may expect in the case of a copper/copper oxide couple a yield voltage up to 0.8 v per cell; in the case of a silver/silver (+2 oxidation state) oxide couple a yield voltage up to 0.9 v per cell; and in the case of a nickel oxyhydroxide/nickel hydroxide couple a yield voltage up to 1 v per cell. It should also be considered that there are a number of complex oxides, which will yield differing cell voltages which expands the available working voltages even further. Nickel iron oxide ($NiFeO_4$) is one such oxide whose complex is available to be used and whose voltage contribution would be about 1 volt. This and other "mixed" oxide complexes are capable of providing other useful voltage opportunities as part of this invention. The nickel oxyhydroxide/hydroxide which was previously discussed is, effectively, another complex oxide system. Some of these offer unique multi-step reactions which may be advantageously applied in the practice of this invention.

At the oxygen electrode, the oxygen, water, and electrons react in the presence of the oxygen electrode active material to reduce the oxygen and form hydroxyl ions ($OH^-$):

$$O_2+2H_2O+4e^- \rightarrow 4OH^-.$$

The flow of electrons is utilized to provide electrical energy for a load externally connected to the hydrogen electrode and oxygen electrode. That load is available to be filled by any number of needs including, but not limited to, powering motive vehicles, lighting devices, heating or cooling devices, power tools, entertainment devices, and other electricity-consuming devices too numerous to mention.

As mentioned herein above, the general redox couples are modified by the principles of the instant invention to inhibit the dissolution of the redox couple in the fuel cell electrolyte and to provide matched catalytic kinetics. Specific additions which may be added to the redox couples to inhibit the dissolution of the active material in the electrolyte and to help provide matched catalytic kinetics include elements such as Li, B, Si, Al, Ni, Cr, Mn, Mo, Misch Metal, Sn, Hg, Pb, Ga, and oxides or alloys thereof. Table 1 shows specific examples of modified silver/silver oxide redox couples. The sample descriptions are given in weight percent of combined ingredients, while the analysis is given in atomic percentage.

As can be seen, reactive elements such as lithium may be added to the redox couple in the form of a non-reactive alloy such as a LiAl alloy. Other elements which may be alloyed with the lithium include boron and silicon. Specifically the LiAl alloy is a 50:50 At. % alloy.

It should be noted that while a specific list of modifying elements for the oxygen electrode redox couples of the instant invention is disclosed herein above, the real invention here is the discovery that additions of catalytic amounts of highly oxidizable elements to the redox couples will aid in creating matched catalytic kinetics for the redox couples. Therefore, in the broadest sense, the instant invention could include any modifiers added to the redox couples which accomplish this kinetics matching.

TABLE 1

| Sample No. | Sample Description | Analysis (ICP for 1-6; EDS rest) |
|---|---|---|
| 4-1 | 5% LiAl, 95% Ag from nitrates | Li: 0.006%, Al: 0.07%, Ag: 99.924% |
| 4-2 | 1% LiAl, 99% Ag from alloy | Li: 0.001, Ag 99.999% |
| 4-3 | 10% LiAl, 90% Ag from alloy | Li: 0.82%, Al: 5.16%, Ag: 94.02 |
| 4-4 | 5% LiAl, 95% Ag from alloy | Li: 0.034%, Al: 0.29%, Ag: 99.676% |
| 4-5 | LiAl, Ag | Ag: 100% |
| 4-6 | 1% B, 99% Ag from alloy | B: 0.22%, Ag: 99.78% |
| 4-7 | Cr, Ag hydroxide | Ag: 100% |
| 4-8 | In, Ag hydroxide | In: 1%, Ag: 99% |
| 4-9 | Ni, Ag hydroxide | Ni: 0.87%, Ag: 99.13% |
| 4-10 | 25% Cu, 75% Ag oxide | Cu: 18%, Ag: 82% |
| 4-11 | 10% Cu, 90% Ag oxide | Cu: 17.4%, Ag82.6% |
| 4-12 | 5% Mo, 95% Ag from hydroxide | Ag: 100% |
| 4-13 | Ag/Mo oxides | Ag: 100% |
| 4-14 | 50% Ni, 50% Ag | Ni: 50%, Ag: 50% |
| 4-15 | 5% Ni, 95% Ag | Ni: 3.3%, Ag: 96.7% |
| 4-16 | 5% Cr, 95% Ag | Ag: 100% |
| 4-17 | 1% Ga, 99% Ag | Ag: 100% |
| 4-18 | 5% Ga, 95% Ag | Ga: 0.7%, Ag: 99.3% |
| 4-19 | 50% Co, 50% Ag | Co: 50%, Ag: 50% |

For comparison, FIG. 1 is a bar chart which shows the performance of many different oxygen electrodes tested at room temperature. FIG. 1 plots the electrode potential in volts versus a standard HgO/Hg reference electrode for a half cell at a current density of $-150$ mA/cm$^2$. As can be seen conventional carbon electrode has an electrode potential of about $-0.40$ volts. It should be noted that the closer to zero the potential, the better the performance of the electrode. Modified carbon electrodes (i.e. mixed carbon materials) have a potential of about $-0.31$ volts. A mixed NiCoMnLi oxide catalyst has a potential of about $-0.24$ volts. Our conventional silver redox couple electrode has an even better potential at about $-0.145$ volts. However, the best electrode are the modified silver alloy redox couples of the instant invention, which has a room temperature potential of $-0.1$ volts at room temperature and a potential of about $-0.075$ volts at 60° C.

Figure 2:
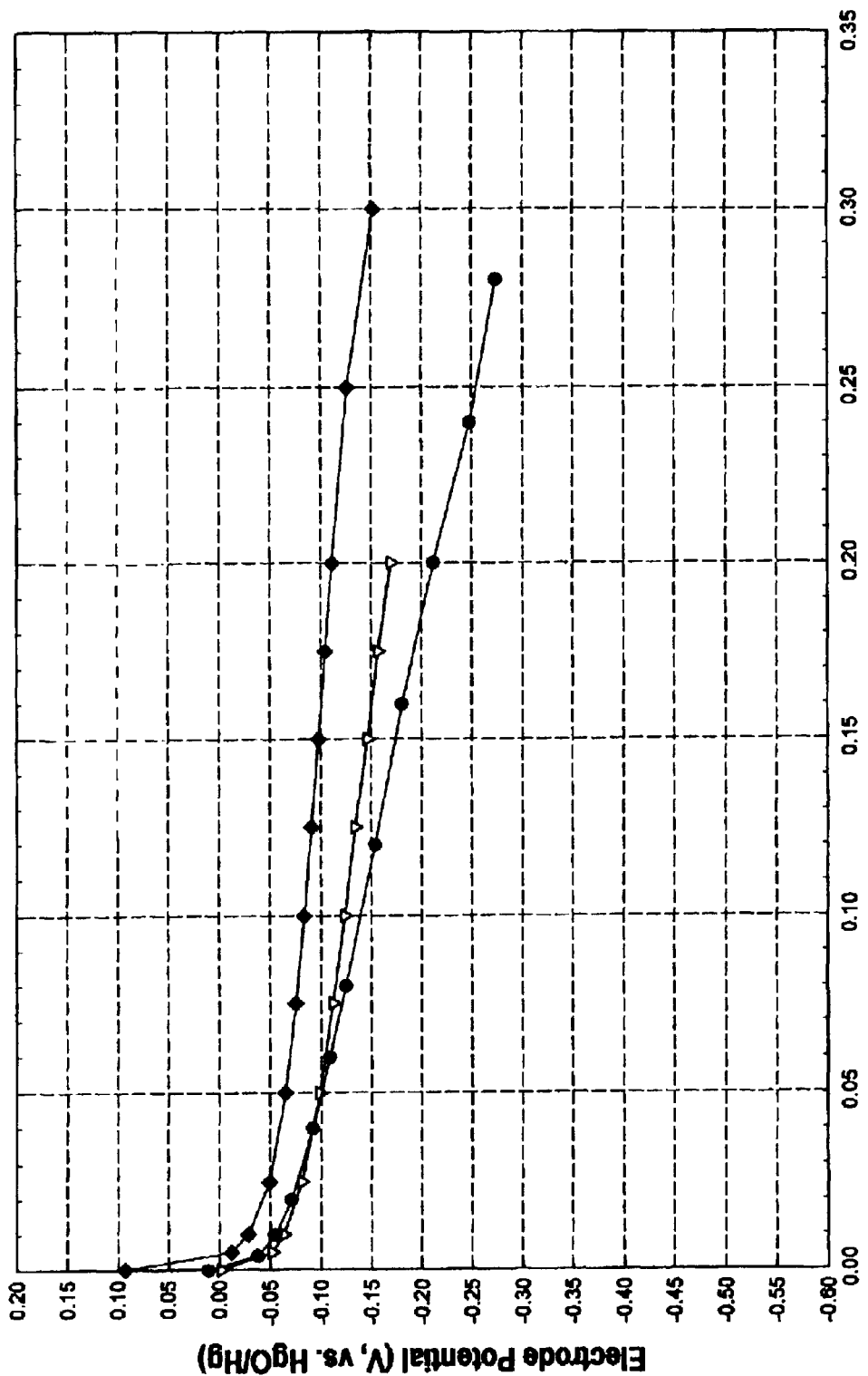
FIG. 2, is a plot of the electrode potential of a conventional platinum oxygen electrode, a non-modified silver redox couple oxygen electrode, and an oxygen electrode in accordance with the present invention.

FIG. 2 plots the electrode potential in volts versus a standard HgO/Hg reference electrode for a half cell versus the current density in A/cm$^2$ for a conventional platinum oxygen electrode (reference symbol ●), a non-modified silver redox couple electrode (reference symbol ▽) and an inventive modified silver redox couple containing 10% LiAl alloy modifier (reference symbol ◆). As can be seen, the modified redox couple oxygen electrode has the best half cell potential of the tested electrodes. Even at currents of up to 300 mA/cm$^2$, the inventive oxygen electrodes have potentials as high as those of the non-modified redox couple at half the current density and as high as those of the platinum electrode at almost one third the current density. Clearly the modification of the redox couple has enhanced the kinetics of the oxygen electrode, and this is by matching the gas side kinetics with the liquid side kinetics.

Figure 3:
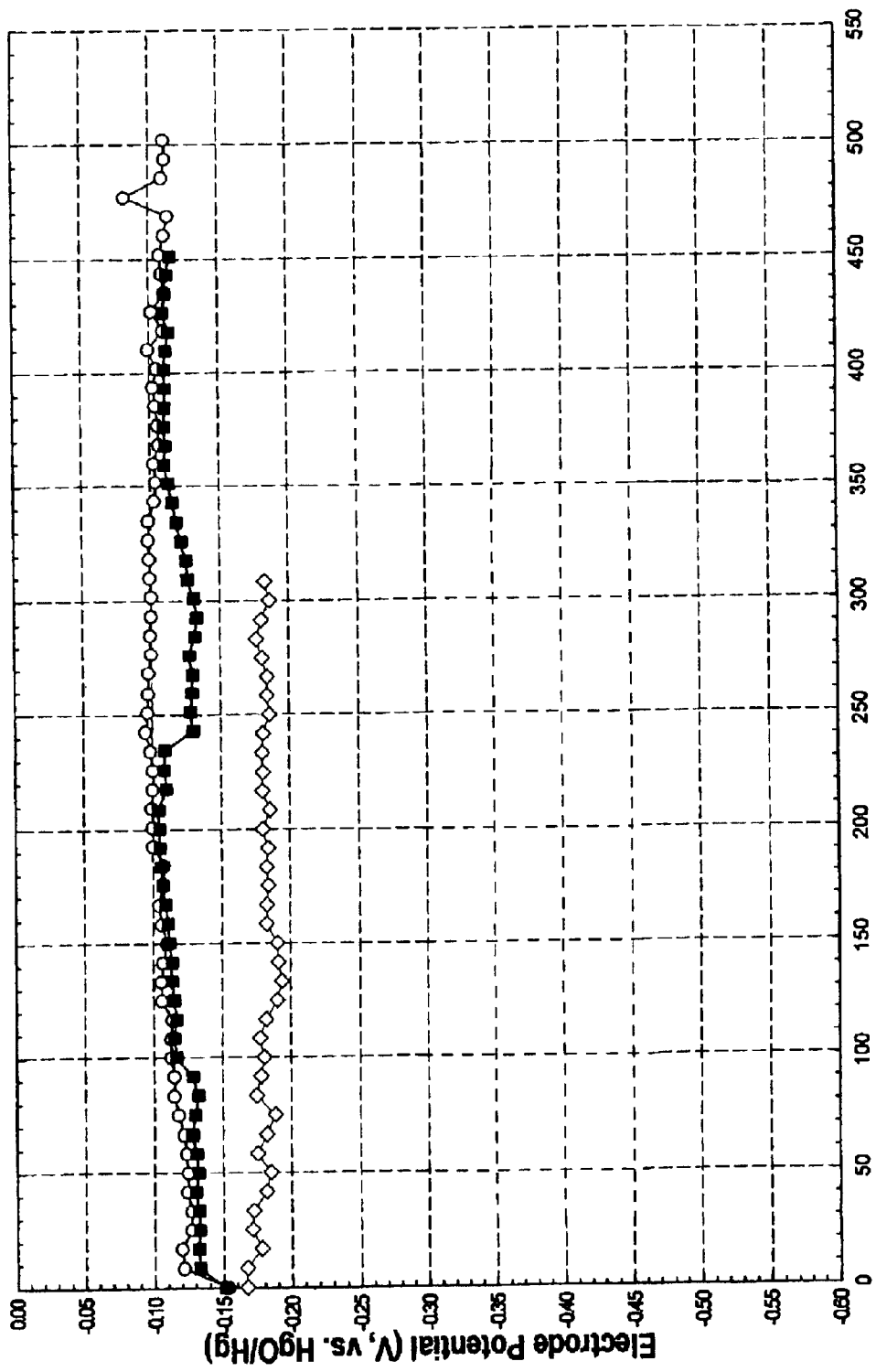
FIG. 3, is a plot of the electrode potential in volts at a discharge current of 150 mA/cm$^2$ versus run time for a non-modified silver redox couple oxygen electrode and two oxygen electrodes in accordance with the present invention.

FIG. 3 plots the electrode (oxygen electrode) potential in volts (versus a reference HgO/Hg electrode) at a discharge current of 150 mA/cm$^2$ for a half cell versus run time in hours for a non-modified silver redox couple electrode (reference symbol ◊) and two inventive modified silver redox couples containing: 1) 10% by weight LiAl alloy modifier in the Ag$_2$O redox material (reference symbol ■); and 2) 5% Ga$_2$O$_3$ by weight in the Ag$_2$O redox material (reference symbol ○). As can be seen from a perusal of FIG. 3, the inventive oxygen electrodes have a higher potential than the control sample, and thus less polarization. Polarization, put simply, is the loss of electrode potential at non-zero levels of current within the electrode. This reduced polarization is attributable to the matched catalytic kinetics of the redox material with the added modifier and is not seen in the non-modified control oxygen electrode.

Figure 4:
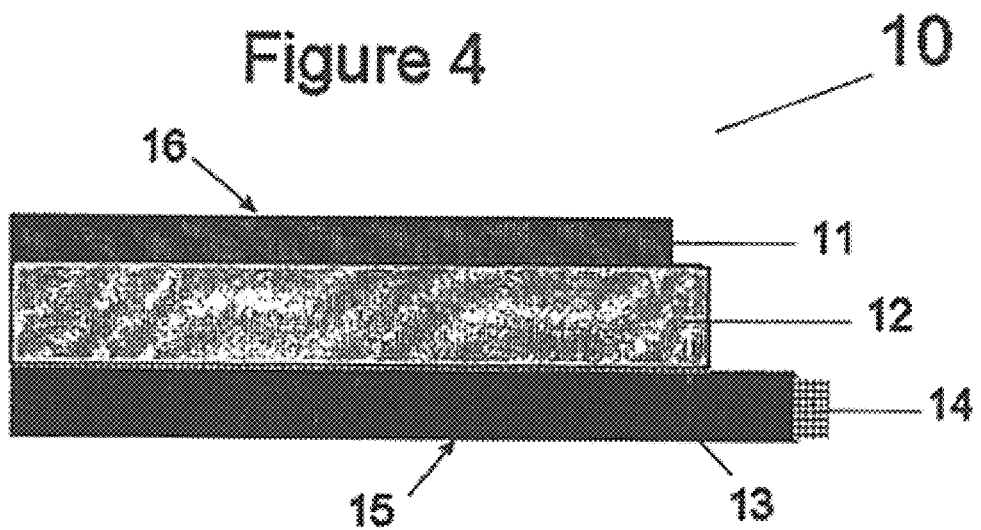
FIG. 4, is a stylized schematic depiction of the oxygen electrode in accordance with the present invention.

The oxygen electrode in the preferred embodiment of the present invention has a layered structure and is shown in FIG. 4. The layered structure promotes oxygen dissociation and absorption within the oxygen electrode 10. Each oxygen electrode 10 is composed of a thin A layer 11, a B layer 12, and a C 13 layer with a current collector grid 14 embedded within the C layer 13. The C layer 13 is on the electrolyte contacting side 15 of the oxygen electrode 10 and the A layer 11 is on the oxygen contacting side 16 of the oxygen electrode 10. The A layer 11 may be composed of carbon particles coated with polytetrafluoroethylene (PTFE). The carbon particles may be acetylene black, Cabot Black Pearl, or Vulcan XC-72 which are well known in the art. The carbon/PTFE mixture may contain approximately 30%–60% PTFE with the remainder comprising carbon, thereby making the carbon 30%–60% teflonated. The teflonated carbon is mixed with the redox couple catalyst. The active redox couple material comprises approximately 10% of the A layer while the teflonated carbon comprises the remaining 90% of the A layer. The B layer 12 may be wholly composed of carbon particles coated with polytetrafluoroethylene. The carbon particles may be acetylene black, Cabot Black Pearl, or Vulcan XC-72 which are well known in the art. The B layer 12 may contain approximately 40%–60% by weight polytetrafluoroethylene with the remainder consisting of carbon particles. The C layer 13 may contain approximately 65 percent a teflonated carbon, 15% graphite, and approximately 20% of the active redox couple material. The carbon added to the B layer 12 is carbon black known as Black Pearls 2000 (Trademark of Cabot Corp.). The graphite is preferably TIMREX SFG 44 graphite (Trademark of Timcal Group). Embedded throughout the C layer is a current collector grid serving both as a substrate and a current collector. Examples of current collector grids include, but are not limited to, mesh, grid, matte, expanded metal, foil, foam and plate. The active redox couple material may also contain a lithium-aluminum alloy, gallium, or other modifier elements described herein for improved performance.

Reactive modifier elements such as lithium may be added to the active redox couple material in the form of a non-reactive alloy such as a LiAl alloy. Other elements which may be alloyed with the lithium include boron and silicon. Specifically the LiAl alloy is a 50:50 At. % alloy. Ga may also be added to the silver oxide.

To produce a fuel cell the oxygen electrodes just described (employing any of the many oxide or redox couples) are used in conjunction with an oxygen electrode or hydrogen electrode. While any functional hydrogen electrode may be used with the inventive oxygen electrodes, preferred embodiments of the fuel cells of this invention will include hydrogen electrodes employing hydrogen storage alloy active materials. It should be noted that the preferred hydrogen electrode catalyst of the alkaline fuel cell is required to do more than catalyze the reaction of H$^+$ ions with OH$^-$ ions to produce water. Initially the hydrogen electrode must catalyze and accelerate the formation of protons and the releaseing of e$^-$ from the incoming molecular H$_2$. This occurs via formation of atomic hydrogen from molecular hydrogen. The overall reaction can be seen as (where M is the hydrogen storage anode active alloy material):

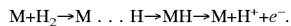

That is, molecular hydrogen (H$_2$) is converted to adsorbed atomic hydrogen (M . . . H) onto the surface of the hydrogen electrode. This adsorbed hydrogen is very quickly adsorbed into the metal hydride to form a metal hydride (MH) in the bulk of the hydrogen storage alloy. This hydride material is then converted to ionic H$_+$ releasing an electron e$^-$. The ionic hydrogen reacts with a hydroxyl ion in the electrolyte to produce water and the electron is released into the external load circuit. Thus the hydrogen electrode catalyst must not only efficiently catalyze the formation of water at the electrolyte interface but must also efficiently dissociate molecular hydrogen into ionic hydrogen. Using conventional hydrogen electrode material, the dissociated hydrogen is transitional and the hydrogen atoms can easily recombine to form molecular hydrogen and escape if they are not used very quickly in the oxidation reaction. With hydrogen storage anode materials, hydrogen is trapped in hydride form as soon as hydrides are created. The hydrogen, as electrochemically released into the electrolyte, are then used as needed to provide the fuel cell's electrical power output.

In addition to being catalytically efficient on both interfaces, the catalytic material must be resistant to corrosion by the alkaline electrolyte. Without such corrosion resistance, the electrode would quickly succumb to the harsh environment and the cell would quickly lose efficiency and die.

One prior art fuel cell hydrogen electrode catalyst is platinum. Platinum, despite its good catalytic properties, is not very suitable for wide scale commercial use as a catalyst for fuel cell hydrogen electrodes, because of its very high cost. Also, noble metal catalysts like platinum, cannot withstand contamination by impurities normally contained in the hydrogen fuel stream. These impurities can include carbon monoxide (which may be present in hydrogen fuel) or contaminants contained in the electrolyte such as the impurities normally contained in untreated water including calcium, magnesium, iron, and copper.

The above contaminants can cause what is commonly referred to as a "poisoning" effect. Poisoning occurs where the catalytically active sites of the material become inactivated by poisonous species invariably contained in the fuel cell. Once the catalytically active sites are inactivated, they are no longer available for acting as catalysts for efficient hydrogen oxidation reaction at the hydrogen electrode. The catalytic efficiency of the hydrogen electrode therefore is reduced since the overall number of available catalytically active sites is significantly lowered by poisoning. In addition, the decrease in catalytic activity results in increased overvoltage at the hydrogen electrode and hence the cell is much less efficient adding significantly to the operating costs. Overvoltage is the difference between the electrode potential and it's equilibrium value, the physical meaning of over-voltage is the voltage required to overcome the resistance to the passage of current at the surface of the hydrogen electrode (charge transfer resistance). The overvoltage represents an undesirable energy loss which adds to the operating costs of the fuel cell.

The hydrogen electrode may be generally composed of an anode active material having hydrogen storage capacity. The anode active material is designed to have a high density of active catalytic sites, resistance to poisoning, and long operating life to provide efficient low cost fuel cell operation.

An anode active material of the instant invention may be a composite of a hydrogen storage material and an additional catalytic material. The preferable anode active material is one which can reversibly absorb and release hydrogen irrespective of the hydrogen storage capacity and has the properties of a fast hydrogenation reaction rate, a good stability in the electrolyte and a long shelf-life. It should be noted that, by hydrogen storage capacity, it is meant that the material stores hydrogen in a stable form, in some nonzero amount higher than trace amounts. Preferred materials will store about 0.1 weight % hydrogen or more. Preferably, the alloys include, for example, rare-earth/Misch metal alloys, zirconium and/or titanium alloys or mixtures thereof. The hydrogen electrode material may even be layered such that the material on the hydrogen contacting surface is formed from a material which has been specifically designed to be highly catalytic to the dissociation of molecular hydrogen into atomic hydrogen, while the material on electrolyte contacting surface is designed to be highly catalytic to the electrochemical oxidation of hydrogen.

Certain hydrogen storage materials are exceptionally useful as alkaline fuel cell hydrogen electrode materials. The useful hydrogen storage alloys have excellent catalytic activity for the formation of hydrogen atoms from molecular hydrogen and also have superior catalytic activity toward the electrochemical oxidation of hydrogen atoms. In addition to having exceptional catalytic capabilities, the materials also have outstanding corrosion resistance toward the alkaline electrolyte of the fuel cell. In use, the alloy materials act as 1) a molecular hydrogen decomposition catalyst throughout the bulk of the hydrogen electrode; and 2) as an internal hydrogen storage buffer to insure that a ready supply of hydrogen atoms is always available at the electrolyte interface.

Specific alloys useful as the hydrogen electrode material are alloys that contain enriched catalytic nickel regions of 50–70 Angstroms in diameter distributed throughout the oxide interface which vary in proximity from 2–300 Angstroms preferably 50–100 Angstroms, from region to region. As a result of these nickel regions, the materials exhibit significant catalysis and conductivity. The density of Ni regions in the alloys provide powder particles having an enriched Ni surface. The most preferred alloys having enriched Ni regions are alloys having the following composition:

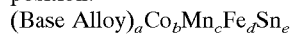

where the Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr; b is 0 to 7.5 atomic percent; c is 13 to 17 atomic percent; d is 0 to 3.5 atomic percent; e is 0 to 1.5 atomic percent; and a+b+c+d+e=100 atomic percent. Such materials are disclosed in U.S. Pat. No. 5,536,591 to Fetcenko et al., published Jul. 16, 1996, the disclosure of which is hereby incorporated by reference.

Figure 5:
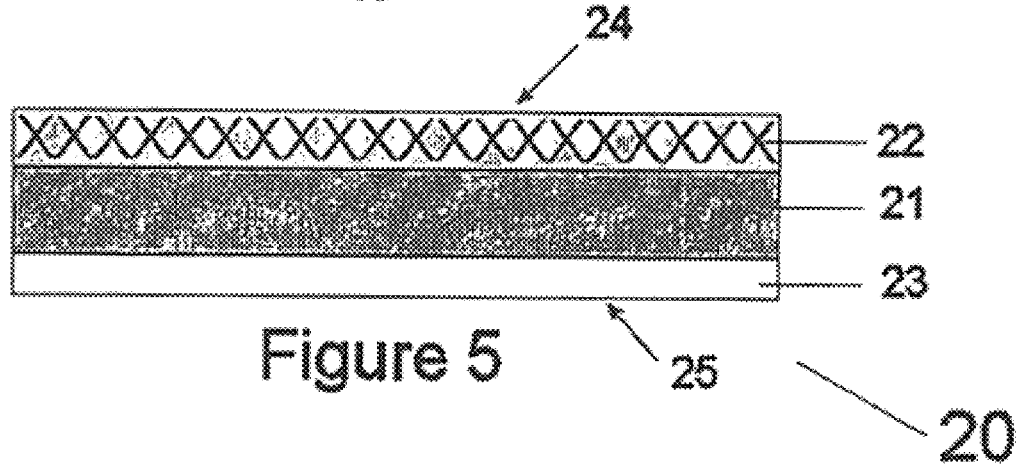
FIG. 5, is a stylized schematic depiction of a hydrogen electrode used in accordance with the present invention.

The hydrogen electrodes in the preferred embodiment of the present invention have a layered structure and are exemplified in FIG. 5. The layered structure promotes hydrogen dissociation and absorption within the hydrogen electrode 20. Each hydrogen electrode 20 is composed of an active material layer 21, a current collector grid 22, and a porous polytetrafluoroethylene layer 23. The active material layer 21 is disposed between the current collector grid 22 and the polytetrafluoroethylene layer 23. The active material layer 21 may be dispersed throughout the current collector grid 22. Examples of current collector grids include, but are not limited to, mesh, grid, matte, expanded metal, foil, foam and plate. The current collector grid may be composed of a conductive material such as nickel. Other conductive materials may be substituted as required by design constraints. The polytetrafluoroethylene layer 23 may be approximately 0.0007 inches thick. The current collector grid 22 is on the electrolyte contacting side 24 of the hydrogen electrode 20 and the polytetrafluoroethylene layer 23 is on the hydrogen contacting side 25 of the hydrogen electrode 20.

The active material layer 21 may be composed of Misch metal nickel alloy, Raney nickel, graphite, and polytetrafluoroethylene powder. A preferred composition of the active material layer 21 is by weight 35% Mischmetal nickel alloy, 46% Raney nickel, 4% graphite, and 15% polytetrafluoroethylene. The most preferred Misch metal nickel alloy has the following composition by weight percent: 50.07% Ni, 10.62% Co, 4.6% Mn, 1.8% Al, 20.92% La, 8.63% Ce, 0.87% Pr, and 2.49% Nd. The graphite may be one with isotropic shape having high electrical and thermal conductivity. A typical example of such graphite is called TIMREX KS-75 (Trademark of Timcal Group). Raney nickel and polytetrafluoroethylene are well known in the art and do not need any further discussion.

Fuel cells of the instant invention using oxygen electrode with redox couples, particularly in combination with the hydrogen storage anodes of the '116 application provide the ability to recapture reverse electrical power flow from an external circuit into said fuel cell, electrolytically producing hydrogen and oxygen which are absorbed and stored through the mechanism of the redox couple in the oxygen electrode and the hydrogen storage material in the hydrogen electrode.

Such fuel cells may, as a system, further comprise an electrolyte conditioning means for conditioning the electrolyte. This electrolyte conditioning system will not only adjust the temperature of the electrolyte (for optimal fuel cell performance) but will also remove water from the electrolyte. The water removal is necessary because water is produced as a by-product of the fuel cell's electrochemical combustion. This water, if not removed would dilute the electrolyte, thus impeding the optimal performance of the fuel cell.

These fuel cells will further include, as a system, a hydrogen supply source including means for continuously supplying fuel, particularly molecular hydrogen, to the hydrogen electrode's first surface region; an oxygen supply source which includes means for continuously supplying molecular oxygen to the oxygen electrode's first surface region; and an electrolyte conditioning system which includes means for continuously conditioning the electrolyte, thereby enabling continuous operation of the fuel cell as an electrical power source.

When the instant fuel cell is run in reverse, as an electrolyzer, during an energy recapture process such as regenerative braking, water is electrolyzed to produce hydrogen and oxygen. That is, when electric powered vehicles are used in stop and go mode in inner cities, regenerative braking systems can recapture kinetic energy, and convert it to electrical energy. In this mode, the electric motors reverse their roles and become generators using up the kinetic energy of the motion. This causes a spike of current which amounts to about 10% of the normal operating load. A conventional fuel cell (alkaline or PEM) cannot accept such surges. This feedback of energy would cause rapid hydrogen and oxygen evolution which would cause the catalysts to lose their integrity and adhesion thereby undermining the overall system performance. In the inventive fuel cell, this will not be a problem, because the hydrogen electrode and the redox couple oxygen electrode will take the surge current and become charged with the produced hydrogen or oxygen respectively, or electrochemically get converted into their reduced or oxidized forms.

It should be noted that the hydrogen electrode and oxygen electrode active materials of the instant invention are robust and very resistant to poisoning. This is true because the increased number of catalytically active sites of these materials not only increases catalytic activity, but enables the materials to be more resistant to poisoning, because with materials of the present invention numerous catalytically active sites can be sacrificed to the effects of poisonous species while a large number of non-poisoned sites still remain active to provide the desired catalysis. Also, some of the poisons are inactivated by being bonded to other sites without effecting the active sites.

Figure 6:
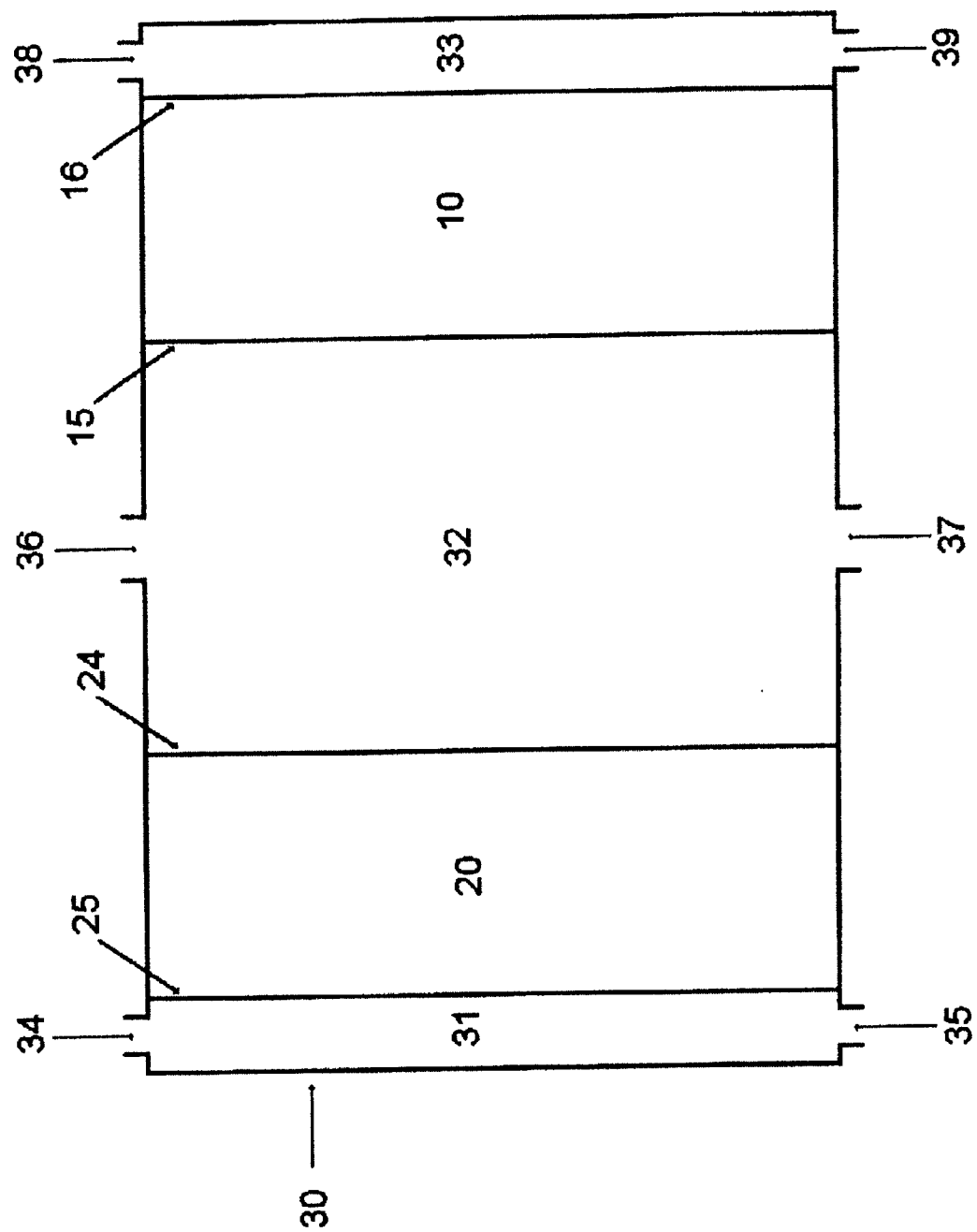
FIG. 6, is a stylized schematic depiction of the instant startup alkaline fuel cell with hydrogen storage anode and oxide couple cathode in a preferred embodiment of the instant invention.

FIG. 6 is a stylized schematic depiction of an alkaline fuel cell 30 incorporating the oxygen electrode 10 and the hydrogen electrode 20 of the instant invention. The fuel cell 30 consists of three general sections: 1) an hydrogen electrode section, which includes the hydrogen electrode 20 and a hydrogen supply compartment 31; 2) the electrolyte compartment 32; and 3) the oxygen electrode section, which includes the oxygen electrode 10 and the oxygen (air) supply compartment 33.

In the hydrogen electrode section, hydrogen or hydrogen containing gas mixtures is supplied under ambient or slightly elevated pressure to the hydrogen supply compartment 31 through hydrogen inlet 34. Hydrogen is then absorbed through surface 25 into the hydrogen electrode 20. The absorbed hydrogen is catalytically broken down by the hydrogen electrode active material into atomic hydrogen which is stored in the hydrogen storage material as a hydride, and then finally reacts at surface 24 with hydroxyl ions to form water. It should be noted that the heat of hydride formation helps to warm the fuel cell to it's optimal operating temperature. Any unabsorbed hydrogen and other contaminant gases or water vapor in the hydrogen supply are vented through outlet 35. The gases that are vented may be recycled if enough hydrogen is present to warrant recovery. Otherwise the hydrogen may be used to provide a source of thermal energy if needed for other components such as a hydride bed hydrogen storage tank.

The electrolyte compartment 32 holds (in this specific example) an aqueous alkaline electrolyte in intimate contact with the oxygen electrode 10 and the hydrogen electrode 20. The alkaline solution is well known in the art and is typically a potassium hydroxide solution. The electrolyte provides water molecules which react with oxygen ions at surface 15 of the oxygen electrode 10 and hydroxyl ions which react with hydrogen ions at surface 24 of the hydrogen electrode 20. The electrolyte is circulated through compartment 32 via inlet 36 and outlet 37 (in alternative embodiments, the electrolyte may be deliberately immobilized as by jelling, etc.) The circulated electrolyte may be externally heated or cooled as necessary, and the concentration of the electrolyte can be adjusted (as via wicking, etc.) as needed to compensate for the water produced by the cell and any losses due to evaporation of water through the electrodes. Systems for conditioning the fuel cell electrolyte are well known in the art and need not be further described in detail herein.

In the oxygen electrode section, oxygen, air, or some other oxygen containing gaseous mixture is supplied to the oxygen supply compartment 33 through oxygen inlet 38. Oxygen is then absorbed through surface 16 into the oxygen electrode 10. The absorbed oxygen is catalytically broken down by the oxygen electrode active material into ionic oxygen, which finally reacts at surface 15 (via the redox couple) with water molecules to form hydroxyl ions. Any unabsorbed oxygen and other gases in the feed (e.g. nitrogen, carbon dioxide, etc.) or water vapor in the oxygen supply are vented through outlet 39.

Figure 7:
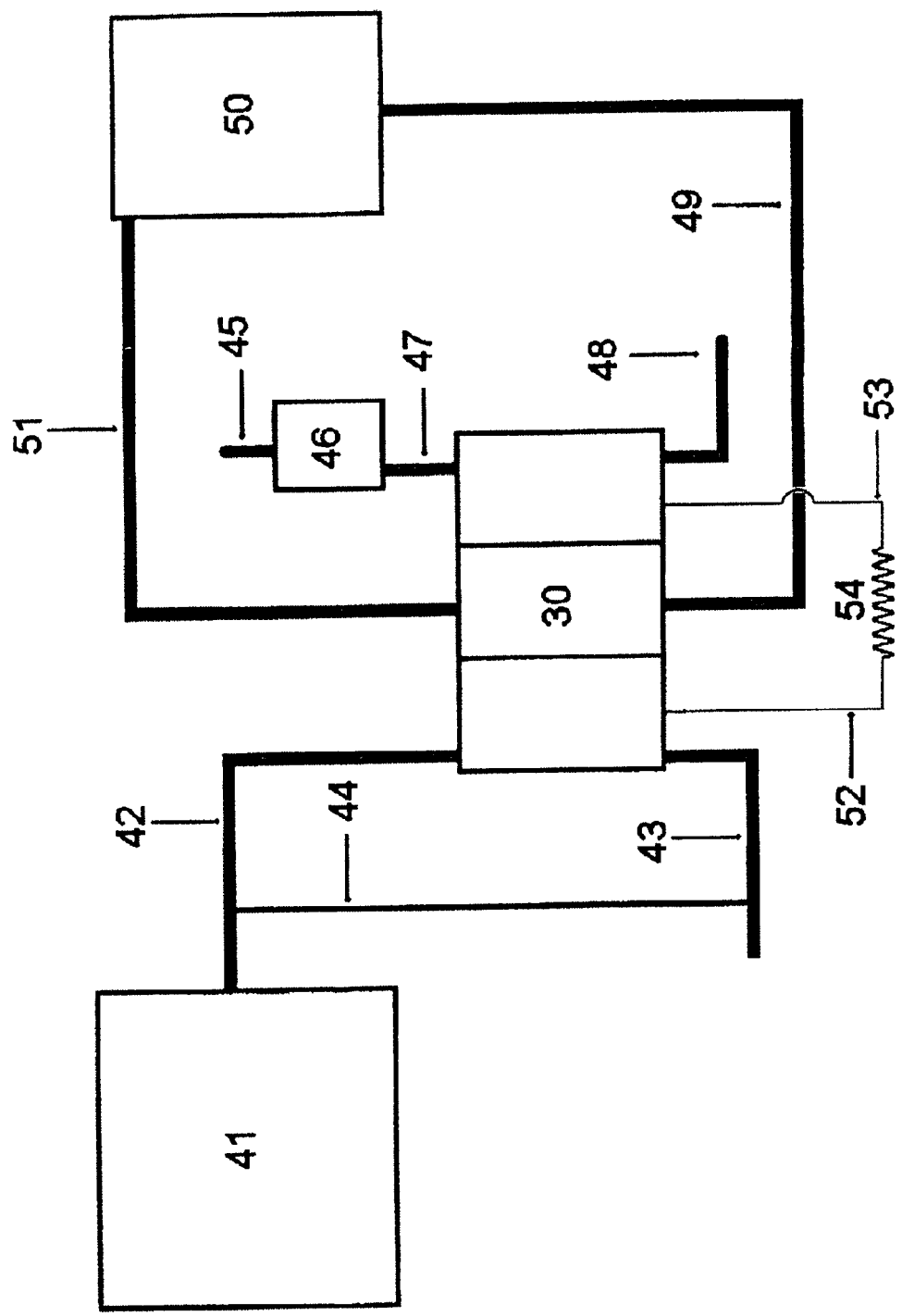
FIG. 7, is a stylized schematic depiction of an energy supply system incorporating the instant startup alkaline fuel cell of a preferred embodiment of the instant invention.

FIG. 7 is a stylized schematic depiction of an energy supply system 40 incorporating the alkaline fuel cell 30 of the instant invention. The energy supply system also includes a source of hydrogen 41. The source may be of any known type, such as a hydride bed storage system, a compressed hydrogen storage tank, a liquid hydrogen storage tank, or a hydrocarbon fuel reformer. The preferred source is a metal hydride storage system. The hydrogen from the source 41 is transported to the fuel cell 30 via input line 42, and excess gases are vented through output line 43. A portion of the gases from output line 43 may be recycled to input line 42 through recycle line 44. The energy supply system also includes a source of oxygen, which is preferably air for economic reasons. The air is drawn into line 45 and then can be passed through a carbon dioxide scrubber 46. The air is then transported to the fuel cell 30 via input line 47. Excess air and unused gases are vented through output line 48 Since this gas stream contains no harmful gases, it may be vented to the environment directly.

The energy supply system also includes an electrolyte recirculation system. The electrolyte from the fuel cell 30 is removed through output line 49 and sent to an electrolyte conditioner 50. The electrolyte conditioner 50 heats or cools the electrolyte as needed and removes/adds water as necessary. The conditioned electrolyte is then returned to the fuel cell 30 via input line 51.

Finally the energy supply system includes electrical leads 52 and 53 which supply electricity from the fuel cell 30 to a load 54. The load can be any device requiring power, but particularly contemplated is the power and drive systems of an automobile.

The instant fuel cell and energy supply systems incorporating it are particularly useful for applications in which instant start and energy recapture are requirements thereof, such as for example in powering a vehicle. For instance, in consumer vehicle use, a fuel cell that has the built in fuel and oxidizer storage of the instant invention has the advantage of being able to start producing energy instantly from the reactants stored in it's electrodes. Thus, there is no lag time while waiting for hydrogen to be supplied from external sources. Additionally, because hydrogen and oxygen can be adsorbed and stored in the respective electrode materials of the fuel cell, energy recapture can be achieved as well. Therefore, activities such as regenerative braking, etc., can be performed without the need for an battery external to the fuel cell because any reactants produced by running the fuel cell in reverse will be stored in the electrodes of the fuel cell. Therefore, in essence, fuel cells employing the instant active electrode materials are the equivalent of a fuel cell combined with a battery. In such a system employing the redox couples, oxygen is also capable of being stored within the electrode to a significant degree as an oxidized component of the couple, preferably a metal/metal oxide couple, a hydroxide/oxyhydroxide, or combinations thereof.

The novel electrochemical cell of the present invention also enables the practice of the method of the invention which, in one embodiment thereof, comprises the indirect and continuous introduction of both the fuel, preferably hydrogen, and the reactant which oxidizes the fuel, preferably oxygen, for the continuous operation of the electrochemical cell as a fuel cell. That is, the hydrogen is, during operation, continuously introduced through a catalytic region in the negative electrode and continuously stored as a hydride in a region of material in the negative electrode which is capable of reversibly storing and releasing hydrogen. Simultaneously therewith hydrogen is electrochemically released from the negative electrode, on its electrolyte side, to participate in the cell reaction process so that continuous supply at the gas side, storage within, and release of hydrogen at the electrolyte side of, the negative electrode is made possible.

At the same time oxygen is continuously introduced at the gas side of the positive electrode through a catalytic region and chemically stored as a material in the form of the charged state of an oxide couple which participates in the cell reaction. Simultaneously with the introduction and chemical storage of the oxygen as just explained the material of the oxide couple which is in the charged state participates in the cell reaction to generate electrical power. Thus an electrochemical cell is continuously operated through the supply to the gas side, storage within, and release from the electrolyte side of, the oxidant so that operation as a fuel cell is enabled. The unique method of the invention of operation of an electrochemical cell as a fuel cell is thus made possible. In the situations in which the fuel cell is run "backwards" or as an electrolyzer to recapture and store energy, such as for example, during regenerative braking, the operating nature as described earlier would not be considered to be disruptive to "continuous" operation.

The drawings, discussion, descriptions, and examples of this specification are merely illustrative of particular embodiments of the invention and are not meant as limitations upon its practice. The electrodes disclosed in the present invention may also be utilized in batteries or other devices where inhibition of the dissolution of catalytic materials in an electrolyte and matched catalytic kinetics would be useful.

What is claimed is:

1. In a fuel cell, an oxygen electrode comprising:
    an oxygen electrode active material including an oxygen electrode active redox couple material modified to match the gas phase kinetics with the electrochemical kinetics of said oxygen electrode active redox couple material.

2. The oxygen electrode of claim 1, wherein said oxygen electrode is modified to inhibit the dissolution of said oxygen electrode active redox couple material in said fuel cell.

3. The oxygen electrode of claim 2, wherein said oxygen electrode active redox couple is modified using at least one modifier element selected from the group consisting of Li, B, Si, Al, Ni, Cr, Mn, Mo, Misch Metal, Sn, Hg, Pb, Ga, and alloys thereof.

4. The oxygen electrode of claim 3, wherein said modifier element is Li.

5. The oxygen electrode of claim 4, wherein said modifier element is alloyed with Al, B, or Si to form a nonreactive modifier element.

6. The oxygen electrode of claim 1, wherein said oxygen electrode active redox couple material is nickel hydroxide/nickel oxyhydroxide.

7. The oxygen electrode of claim 1, wherein said oxygen electrode active redox couple material comprises a metal/metal oxide couple of an element selected from the group consisting of copper, silver, zinc and cadmium.

8. The oxygen electrode of claim 1, further comprising a hydrophobic component.

9. The oxygen electrode of claim 8, wherein said hydrophobic component comprises polytetrafluoroethylene (PTFE).

10. The oxygen electrode of claim 9, wherein said PTFE is at least one of:
    a) intimately mixed with said oxygen electrode active material;
    b) graded within said oxygen electrode active material; or
    c) a separate layer within said oxygen electrode.

11. The oxygen electrode of claim 1, further comprising a current collector extending within said active material.

12. The fuel cell oxygen electrode of claim 11, wherein said current collector comprises an electrically conductive mesh, grid, foam or expanded metal.

13. The fuel cell oxygen electrode of claim 1, further comprising a catalytic carbon component.

14. In a fuel cell, said fuel cell including an oxygen electrode active material, the improvement comprising, in combination:
    said oxygen electrode active material having oxygen storage capacity;
    said oxygen electrode active material including an oxygen electrode active redox couple material modified to match the gas phase kinetics with the electrochemical kinetics of said oxygen electrode active redox couple material; and
    said oxygen electrode active redox couple material being modified to inhibit the dissolution of said oxygen electrode active redox couple material in said fuel cell.

15. The fuel cell of claim 14, wherein said oxygen electrode active redox couple is modified using at least one modifier element selected from the group consisting of Li, B, Si, Al, Ni, Cr, Mn, Mo, Misch Metal, Sn, Hg, Pb, Ga, and alloys thereof.

16. The fuel cell of claim 15, wherein said modifier element is Li.

17. The fuel cell of claim 16, wherein said modifier element is alloyed with Al, B, or Si to form a nonreactive modifier element.

18. The fuel cell of claim 14, wherein said oxygen storage capacity provides said fuel cell with instant startup capability.

19. The fuel cell of claim 14, wherein said oxygen storage capacity provides said fuel cell with the ability to accept recaptured energy by running in reverse as an electrolyzer.

20. The fuel cell of claim 14, wherein said oxygen electrode active redox couple material provides for said oxygen storage capacity.

21. The fuel cell of claim 20, wherein said oxygen electrode active redox couple material is nickel hydroxide/nickel oxyhydroxide.

22. The fuel cell of claim 20, wherein said oxygen electrode active redox couple material comprises a metal/metal oxide couple of an element selected from the group consisting of copper, silver, zinc and cadmium.

23. The fuel cell of claim 14, wherein said oxygen electrode active material further includes a hydrophobic component which comprises polytetrafluoroethylene.

24. The fuel cell of claim 14, wherein said oxygen electrode active material further includes a current collector extending within said oxygen electrode active material.

25. The fuel cell of claim 14, wherein said current collector comprises an electrically conductive mesh, grid, foam or expanded metal.

26. The fuel cell of claim 14, wherein said oxygen electrode further includes a catalytic carbon component.

27. The fuel cell of claim 14, wherein said fuel cell further includes an hydrogen electrode, said hydrogen electrode including an active material having hydrogen storage capacity.

28. The fuel cell of claim 27, wherein said hydrogen storage capacity additionally provides said fuel cell with instant startup capability.

29. The fuel cell of claim 27, wherein said hydrogen storage capacity additionally provides said fuel cell with the ability to accept recaptured energy by running in reverse as an electrolyzer.

30. The fuel cell of claim 27, wherein said hydrogen storage capacity provides thermal energy to said fuel cell via the heat of formation of the hydride thereof.

31. The fuel cell of claim 27, wherein said hydrogen electrode active material is a hydrogen storage alloy which does not include noble metal catalysts.

32. The fuel cell of claim 31, wherein said hydrogen electrode active material is resistant to poisoning.

33. The fuel cell of claim 31, wherein said hydrogen storage alloy is selected from the group consisting of Alkaline Earth-Nickel alloys, Rare Earth/Misch metal alloys, zirconium alloys, titanium alloys, and mixtures or alloys thereof.

34. The fuel cell of claim 33, wherein said hydrogen storage alloy has the following composition:

(Base Alloy)$_a$Co$_b$Mn$_c$Fe$_d$Sn$_e$ where the Base Alloy comprises 0.1 to 60 atomic percent Ti, 0.1 to 40 atomic percent Zr, 0 to 60 atomic percent V, 0.1 to 57 atomic percent Ni, and 0 to 56 atomic percent Cr; b is 0 to 7.5 atomic percent; c is 13 to 17 atomic percent; d is 0 to 3.5 atomic percent; e is 0 to 1.5 atomic percent; and a+b+c+d+e=100 atomic percent.

35. The fuel cell of claim 27, wherein said hydrogen electrode further includes a hydrophobic component.

36. The fuel cell of claim 35, wherein said hydrophobic component is polytetrafluoroethylene (PTFE).

37. The fuel cell of claim 36, wherein said PTFE is intimately mixed with said hydrogen storage alloy.

38. The fuel cell of claim 36, wherein said PTFE is a layer within said hydrogen electrode.

39. The fuel cell of claim 27, wherein said hydrogen electrode additionally includes a substrate component which provides only for electrical conductivity and comprises an electrically conductive powder intimately mixed with said hydrogen storage material.

40. The fuel cell of claim 39, wherein said electrically conductive powder comprises at least one material selected from the group consisting of copper, a copper alloy, nickel, a nickel alloy, and carbon.

41. The fuel cell of claim 27, wherein said hydrogen electrode additionally includes a substrate component which provides for both electrical conductivity and mechanical support and comprises an electrically conductive mesh, grid, foam, matte, foil, foam, plate, or expanded metal.

42. The fuel cell of claim 41, wherein said substrate component comprises an electrically conductive mesh, grid, foam, or expanded metal.

43. The fuel cell of claim 42, wherein said mesh, grid, foam, or expanded metal is formed from nickel or nickel alloy.

44. The fuel cell of claim 42, wherein said mesh, grid, foam, or expanded metal is formed from copper, copper plated nickel or a copper-nickel alloy.

* * * * *